United States Patent [19]

Becker et al.

[11] Patent Number: 4,778,547

[45] Date of Patent: Oct. 18, 1988

[54] PROCESS FOR MAKING A DIMENSIONALLY STABLE, EMBOSSED, ORNAMENTED TILE SURFACE COVERING

[75] Inventors: Stephen E. Becker; Walter J. Lewicki, Jr., both of Lancaster, Pa.

[73] Assignee: Armstrong World Industries, Inc., Lancaster, Pa.

[21] Appl. No.: 5,267

[22] Filed: Jan. 20, 1987

Related U.S. Application Data

[63] Continuation-in-part of Ser. No. 660,004, Oct. 11, 1984, abandoned.

[51] Int. Cl.[4] .......................... B32B 31/04; B32B 31/20
[52] U.S. Cl. ........................................ 156/87; 156/209; 156/220; 156/238; 156/252; 156/277; 156/309.6
[58] Field of Search ........................ 428/203, 204, 131; 156/252, 273.3, 273.7, 277, 209, 219, 220, 238, 253, 380.8, 87, 196, 199, 285, 286, 308.2, 309.6, 324.4, 580, 581, 583.1

[56] References Cited

U.S. PATENT DOCUMENTS

| | | |
|---|---|---|
| 1,861,663 | 6/1932 | Lahey . |
| 2,991,216 | 7/1961 | Hsu . |
| 3,446,685 | 5/1969 | Goldstone ........................ 156/219 |
| 3,658,617 | 4/1972 | Fearnow . |
| 3,804,657 | 4/1974 | Eyman . |
| 4,219,376 | 8/1980 | Roman . |
| 4,312,686 | 1/1982 | Smith . |
| 4,326,909 | 4/1982 | Slavik . |

Primary Examiner—Merrell C. Cashion, Jr.

[57] ABSTRACT

The process for making a dimensionally stable, embossed, ornamented surface covering suitable for use as a floor or wall tile, involving, inter alia, laminating and embossing a resinous thermoplastic top layer having a plurality of openings extending through its thickness to allow the escape of air and extending to a base material or substrate of pre-formed, low-density, reinforced, porous thermoplastic material. The base material may include hollow non-thermoplastic particles. The composite structure is subjected to heat and pressure in a flatbed press having a cooled embossing plate and a cooled back-up plate, to emboss the structure without deformation, fuse the resins and render the top layer substantially impermeable. The improvement comprises providing a second resinous thermoplastic layer between the top layer and the base material, the second layer being capable of allowing passage of air through its thickness during the embossing and fusion step, and being adapted to soften and flow before the top layer does, thereby assuring complete closure of all openings in the top layers of the product.

17 Claims, 1 Drawing Sheet

PROCESS FOR MAKING A DIMENSIONALLY STABLE, EMBOSSED, ORNAMENTED TILE SURFACE COVERING

CROSS-REFERENCE TO RELATED APPLICATION

The present application is a continuation-in-part of co-pending application Ser. No. 660,004, filed Oct. 11, 1984, now abandoned.

BACKGROUND OF THE INVENTION

This invention relates generally to an improved, dimensionally stable, embossed, tile surface covering and the process for forming it. More particurlarly, the invention relates to such a tile surface covering having deeply embossed areas and an improved replication of the embossed surface of the embossing plate.

THE PRIOR ART

It has been previously known to produce embossed resinous surface coverings wherein the embossing was achieved chemically or mechanically. It has been further known to provide decorative designs on such surface covering by applying variously-colored inks to either the top surface of the base material, or to a film wear layer thereon, prior to, or subsequent to, the embossing of the structure. However, there have been problems in the past involving distortion of the material and the design thereon, registration of designs and embossing, the inability to obtain full replication of embossing surface detail, development of stresses in the product created during the formation thereof, and dimensional stability of the product, in the use of mechanical embossing where different depths of embossing combined with full replication of the embossing surface was desired.

There has also been a problem involving complete sealing of the air-release openings, such as those use in the process of co-pending application Ser. No. 434,631, now abandoned, when embossing plates were used which were very deep and had smooth recessed portions.

U.S. Pat. No. 3,562,059 relates to a method of decorating a plastic foam form by placing the printed face of the polymer film, blanked to the shape of the foam form, against the foam, covering the film with a woven Teflon cloth, applying heat and pressure to the face of the cloth, and then stripping the cloth from the film.

U.S. Pat. No. 3,180,776 relates to the ornamentation of plastic articles by forming a color support blank of incompletely cured, filled, resinous material, printing decorations thereon with appropriate inks, and subjecting the blank to a high frequency heat treatment to harden the inks. A transparent, incompletely cured, filled, plastic sheet of similar resinous material may then be placed on the previously formed blank, with the printed surface on the color support blank in contact with the transparent sheet. The product is formed by molding and fusing the material using heat and pressure.

U.S. Pat. No. 3,024,154 relates to the art of embossing thermoplastic film which comprises, heating a relatively thick sheet of thermoplastic material to a temperature above its softening temperature and that of the film, bringing one surface of the film in a relatively cool condition into contact with the surface of the thicker sheet, moving the film and sheet together between a cooled, indented embossing element and a backing element, to press the film and sheet into the indentations in the embossing element, and then cooling the composite structure.

U.S. Pat. No. 3,325,332 relates to a method of laminating a relatively thick plastic film to a compatible plastic foam by heat-softening the foam and pre-heating only the contacting surface of the film and then pressing the film and foam together.

U.S. Pat. No. 3,658,617 relates to a method for forming a laminated floor covering wherein a decorated wear layer is provided on a strippable backing which is removed prior to passing the wear layer into the nip of the roll structure along with an extruded adhesive, a reinforcing member, and a foam or other permanent backing to form a laminated structure wherein the wear layer, the reinforcing structure, and the permanent backing are all adhesively bonded to each other.

Other U.S. Patents having general relationships to various features of the present application include U.S. Pat. Nos. 4,312,686; 2,558,791; 2,991,216 and 4,289,559.

The problems previously indicated herein have not been satisfactorily solved by the foregoing prior art.

SUMMARY OF THE INVENTION

This invention relates to a dimensionally stable, embossed, ornamented surface covering which may be in the form of a floor or wall tile and process for making it, wherein a first resinous, thermoplastic layer which is transparent after fusion and which has openings extending through its thickness, and a second resinous layer capable of allowing passage of air through its thickness, are placed on the top surface of a porous, low-density thermoplastic base material. The second resinous layer is adapted to soften and flow prior to the softening and flowing of the first resinous layer in the subsequent embossing and fusion step. The prior melting and flowing of the second resinous layer assists and assures complete closure of all openings in the top layers thereby rendering them substantially impermeable after fusion.

The first resinous layer may be in the form of a film, a thin layer of sintered dryblends or powder or gelled plastisol. The openings extending through the thickness of the first resinous layer may be initially present therein or may be formed at a later time, for example, by perforating. However, the openings in the first layer must be present prior to the embossing and fusion step. The second resinous layer may be in the form of a plastisol, a perforated film, a sintered resinous powder, an open-celled foam, or a dryblend, but must be capable of allowing passage of air through its thickness when air is forced through the openings in the first layer by pressure of the embossing plate thereon prior to fusion of the resins.

The porous base material may be a lightly sintered resinous dryblend structure or a sintered powder having hollow non-thermoplastic particles therein, or a foam and may be reinforced with a material such as glass scrim or other fibrous material. The first resinous layer may be provided on a release carrier and may be decorated on the surface which faces away therefrom. The second resinous layer may be applied over the decorated surface of the first layer, or on top of the base material. Optionally, if the first and second layers are transparent after fusion, the decoration may be provided on the top surface of the base material. The top layers may be cut to the desired tile dimensions in register with the design portions while they are on the release carrier without cutting the carrier, interfaced with the top surface of a piece of the base material of similar size, and the release carrier removed, or, the first and second layers may be interfaced with the top surface of a sheet of the base material, and the top layers and base material cut in register with the design on the first layer simultaneously, after removal of the release carrier. Adhesive may be applied to the bottom surface of the second layer or to the top surface of the base material.

When laminating the top layers to the base material, heat at a temperature sufficient only to activate the adhesive is used, together with light pressure, to assure bonding of the second layer to the base material. In both cases, the base material with the first and second layers thereon, is then subjected to heat, which may be in the form of high frequency electrical energy, and pressure in a flatbed press having a cooled embossing plate and a cooled back-up plate, to emboss the structure, fuse the reins and render the first and second layers substantially impermeable. The first and second layers may be vinyl, and may be perforated to allow air trapped in the deeper recesses of the embossing plate to escape therethrough. The perforations are sealed during the embossing and fusing of the resins in the composite structure.

The prior art problems previously indicated herein are solved by the present invention. Since the base material is first a porous low-density material with hollow, non-thermoplastic particles therein, it can be compressed vertically in a flatbed press with a minimum of lateral flow. This permits deeper, more clearly defined embossing and less distortion in the product. The process further substantially eliminates the distortion of the decoration on the structure, and of the base material which is normally encountered when using a flatbed embossing press due to entrapped air, especially with low density compositions that are difficult to heat and cool. This invention further controls distortion through the use of high-frequency heating, and compositions which are receptive thereto, coupled with cooling of the embossing and back-up plates of the press, so that the materials can be heated quickly to a temperature sufficient for embossing while avoiding distortion of the ornamentation under pressure. Lack of distortion of the ornamentation due to entrapped air in the process of this invention, of course, makes it possible to easily emboss in register with the decoration. As is commonly known, thermoplastic films or layers are not dimensionally stable when heated sufficiently so that they may be embossed. They tend to expand or contract differently in different parts of the sheet.

The avoidance of heating the materials to high temperatures prior to the final emobssing and fusion step, substantially eliminates the build-up of stress in the materials. This, together with the flat, cooled bottom surface of the embossing press, the inclusion of the reinforcing glass scrim, and the use of high frequency heating, produces a product that is dimensionally stable, stays flat, and doesn't curl when subjected to conditions of heat and moisture.

BRIEF DESCRIPTION OF THE DRAWING

The FIGURE is a flow diagram depicting the steps followed in carrying out the embodiments of the process of this invention.

DESCRIPTION OF THE PREFERRED EMBODIMENTS

Figure 1:
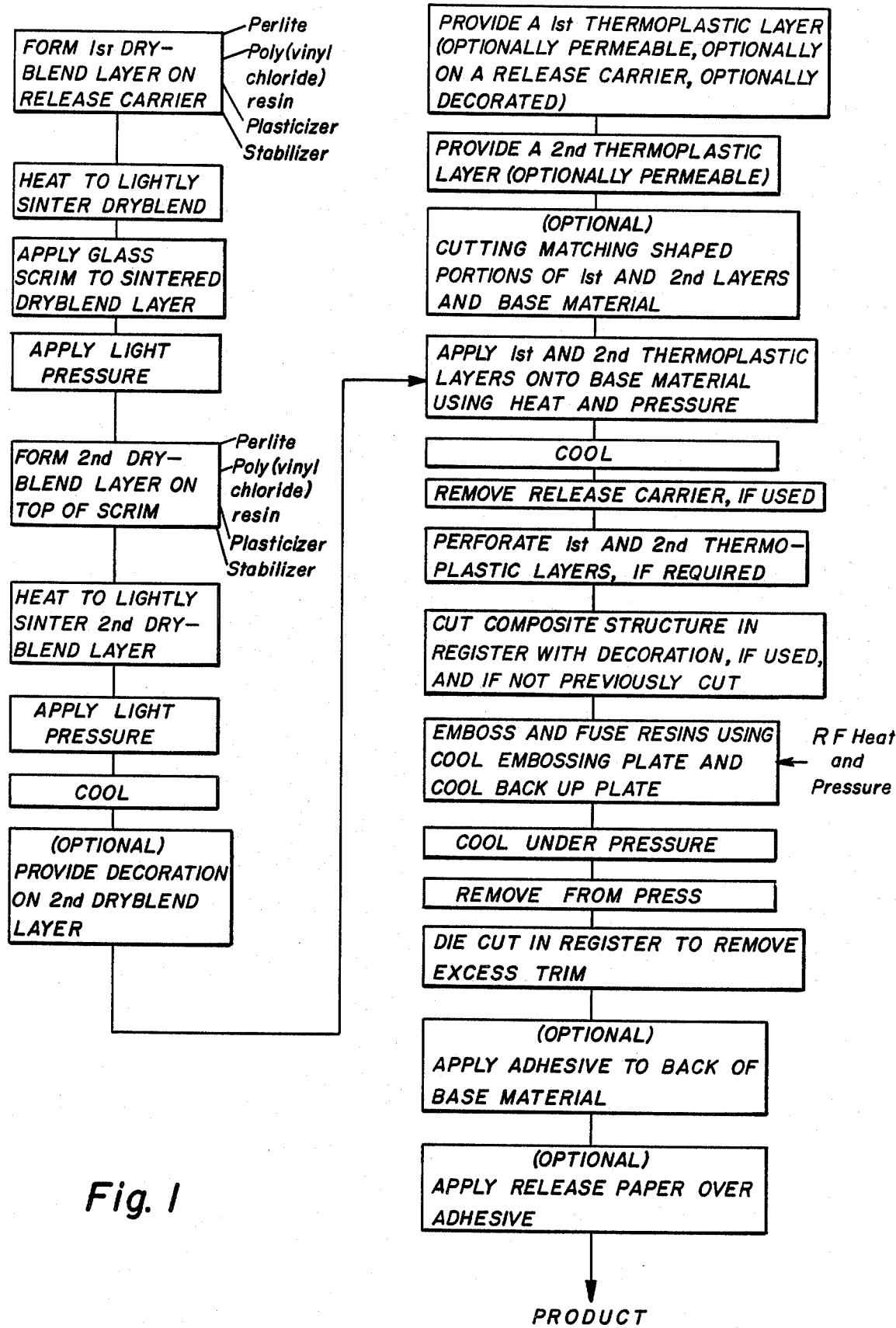

The flow diagram of FIG. 1 illustrates various embodiments of the invention.

In the first embodiment of the invention, the manufacturing process begins with the formation of a porous low-density base material. As indicated in the flow chart of FIG. 1, a first dryblend layer is formed on a release carrier. In the formation of the base material a mixture of resinous dryblend particles and expanded perlite is prepared. The dryblend is in the form of free-flowing homogeneous mixture of unfused thermoplastic resin particles, including liquid vinyl plasticizer, filler, pigment, and vinyl stabilizer.

Poly(vinyl chloride) is the preferred resin for use in forming the surface covering of the present invention, although copolymers of vinyl chloride with minor proportions of other materials such as vinyl acetate, vinylidene chloride, other vinyl esters such as vinyl proprionate, vinyl butyrate as well as alkyl substituted vinyl esters may be used.

Other thermoplastic resins which are receptive to high frequency heating or which can be combined with materials receptive to high frequency heating may also be used. These may include, for example, polyethylene, polyurethanes, polyesters, polyamides, polyacrylates (e.g., polymethyl methacrylate) as well as polymers derived from acetates and cellulose esters.

The free-flowing mix of resin, plasticizer, stabilizer, pigment, and filler may be readily formed by adding the resin, for example a homopolymer of vinyl chloride in the form of discrete particles, along with the vinyl resin plasticizer such as di-2-ethylhexyl phthalate, butylbenzyl phthalate, epoxidized soybean oil, or tricresyl phosphate, filler, pigment, and suitable vinyl resin stabilizers to a mixer, or blender, such as a Henschel blender, where they are mixed under moderate heat, for instance, at a temperature of about 160°–220° F., for a period of time to ensure that the liquid plasticizer and the stabilizer become absorbed and thus diffused throughout the resin particles and the remaining ingredients absorbed thereon. Care is taken so that no fusion of the resin particles occurs during the mixing, and the temperature must be kept below that at which such would occur. Generally speaking, the addition of fillers and/or pigments to the mix may be made either initially, at the end of the mixing cycle when the resin particles remain relatively warm, or after the dryblend particles have been mixed and cooled.

The dryblend composition useable in the present invention may include the following ingredients in the indicated ranges, based on 100 parts of resin:

| Ingredients | Parts by weight |
|---|---|
| Poly(vinyl chloride) Dispersion Grade Resin - Average Mw 70,000–80,000 | 50–100 |
| Poly(vinyl chloride) Blending Grade Resin - Average MW 33,000–46,000 | 50–0 |
| Dioctyl phthalate, plasticizer | 25–75 |
| Organatin stabilizer | 1–3 |
| Titanium dioxide paste (50% in DOP) | 0–5 |
| Limestone (50 mesh) filler | 0–200 |

The dryblend/perlite mix used in the present invention is formed by a simple mixing or tumbling together of the two dry materials until a uniform blend is obtained. About 90 parts by weight of the dryblend and about 10.5 parts by weight of the perlite are used.

The quantity of perlite used in the composition, however, can be varied considerably, but the upper limit is determined by the ability of the composition to hold together in a useful manner after heating and consolidation. This upper level is affected by the particle size of the perlite used, and, since we add or mix our proportions by weight, the density of the perlite particles. The perlite particles preferred for use in the present invention is Spherepack MM-100, sold by Patentech Corporation, Shepherd Grove, Ill. The particle size of the perlite useable in the present invention ranges from about 35 to 850 microns. The average particle size for the Spherepack MM-100 perlite is about 60 microns. The effective range of the quantity of perlite useable would be between 2 and 20 percent by weight when combined with a quantity of dryblend in the range of from about 98 to 80 percent by weight. The preferred range of the perlite used would be about 5 to 15 percent by weight, and the most preferred range would be about 8 to 12 percent by weight. The levels of other types of perlite, for example, the 3.5 and 10 pound/cubic foot bulk density material, may differ dur to their different particle size and/or density. Although it is preferred that the base material should be formed using expanded perlite as the hollow particles, it is contemplated that other hollow particles of, for example, glass, ceramic, or organic materials could be used within the scope of the invention.

A layer of the perlite-containing dryblend mixture about 100 mils thick is then formed on a release-surfaced carrier and heated to a temperature sufficient to cause surface portions of the resinous particles to melt slightly and stick together at their points of contact with each other. A reinforcing layer of non-woven glass scrim or loose glass fibers is then placed on the perlite-containing dryblend layer so formed and light consolidating pressure is applied thereto. The glass scrim may have a basis weight of about 10 g-50 g/m². Alternatively, the reinforcing layer may comprise woven or non-woven fibrous layers of glass, polyester, polyamide, and the like. Another layer of similar thickness of the dryblend and perlite mixture is formed on top of the scrim and this second layer is then heated to a temperature similar to that used in forming the first layer and slight consolidating pressure is again applied. Alternately, the porous base may consist of a homogeneous blend of resinous dryblend or powder containing loose fibers such as glass, polyester, and the like. The resulting base material is now in a friable but suitable condition to be handled for further processing. It is also porous, allowing it to be subsequently compressed in a vertical direction with minimum lateral flow. It is also receptive to high frequency energy. The preferred reinforced, sintered dryblend and expanded perlite composite is a unique porous structure in which each individual pore is reinforced by the rigid cellular structure of the individual expanded perlite particle. The collective effect of the many reinforced pores contributes to a great extent to the necessary dimensional stability and light weight of the product, while at the same time still allowing crushability during the embossing step with limited lateral flow. The porous structure is such that the dryblend layer contains air within the layer and air can pass or flop through the layer from one side to the other side or from one side and out the edges of the layer.

Although it is preferred that the base material should be as described, other porous structures such as open-celled thermoplastic resin foams (e.g., vinyl foam), thermoplastic matting, open-cell polyurethane foam, and the like may be used; however, results generally are not as good since print distortion, material extrusion, and structural collapse may occur during subsequent processing operations.

In one embodiment of the invention, a dimensionally stable release carrier is then provided with a first resinous thermoplastic film preferably about 4 mils thick and having ornamented design portions on the surface therof facing away from the carrier. The film may, however, range from about 0.1-15.0 mils in thickness, and, at this point, may be permeable or impermeable, but must be capable of becoming permeable when the composite structure is subsequently embossed. The film may be cast, calendered, extruded, or laminated onto the release carrier and, the design or decoration may be applied either prior to, or subsequent to, application of the film to the release carrier. Also, it is recognized that the decoration may be applied to the top surface of the base material and non-decorated films or coatings applied thereover. The first resinous film preferably comprises poly(vinyl chloride) and/or vinyl chloride copolymers (e.g., vinyl chloride and acrylic monomers and copolymers such as ethylene-acrylic acid). However, other thermoplastic materials such as polyesters, polyurethanes, polyamines, polyolefins (e.g., polyethylenes), polyacrylates, and the like could be used in the invention. Adhesive may be applied to the decorated surface of the film or, the adhesive may be in the ink or may be combined with the ink.

A second resinous layer which also may be in the form of a film may then be provided either on the exposed surface of the first layer or on the top surface of the base material. As previously stated, the decoration may be either on the first resinous layer surface which faces away from the release carrier, or on the top surface of the base material.

The first and second layers may be die cut to the desired dimensions in register with the design while they are on the release carrier, but without cutting the carrier. The base material is cut into shapes corresponding to those of the cut portions of the top layers.

The decorated cut portions of the top layers are then placed on the top surface of the shaped portions of the base material, the release carrier is removed and the top layers are perforated. The both top lyers are perforated all the way through and the perforations are in register particularly when the top layers are in the press during embossing. The die-cut layers are laminated to the base and may be preheated to only warm the adhesive so that lamination can be carried out at a relatively low temperature. The pieces of base material may also be preheated, but not all the way through. The composite structures so formed are then put into a flatbed press comprising a cooled deep embossing plate and a cooled flat back plate. High frequency energy is applied after the press is closed. The temperature of the material goes from ambient temperature to about 350° F. Because the greatest heat is generated within the structure of the base material which is next to the second of the resinous top layers, it will soften and flow before the first resinous top layer and thereby assist and ensure sealing of the air passageways therein particularly in the first resinous top layer. The high frequency power is then turned off and the pieces are allowed to sit under pressure for about 4 to 20 seconds. The press is then opened, the pieces removed and die-cut in register. Adhesive is applied to the back of the pieces and release paper is applied.

In the second embodiment of the invention the same material and procedures are used except that the top layers and base material are die-cut simultaneously in register with the design portions after the first and second layer or films have been applied to the top surface of the base material, and after separation of the release carrier.

The following examples are given for purposes of illustration, but the invention is not limited to these examples. All parts and percentages are by weight unless otherwise specified.

EXAMPLE I

In forming the base material for the surface covering of the present invention, dryblend granules were prepared by mixing the following components together in a conventional Herschel dryblending apparatus through a heat history from ambient conditions to 220° F. to ambient conditions, using the following ingredients in the indicated ranges:

| Ingredients | Parts by Weight |
| --- | --- |
| Poly(vinyl chloride) Dispersion Grade Resin | 66.6 |
| Poly(vinyl chloride) Blending Grade Resin | 33.4 |
| Dioctyl phthalate | 25–75 |
| Organotin Stabilizer | 2 |
| Titanium Dioxide Paste (50% in DOP) | 2 |
| Limestone (50 Mesh) Filler | 100 |
| The dryblend granules formed as above were then mixed with perlite particles in the following proportions: | |
| Dryblend particles | 90 |
| *Perlite (Spherepack MM-100) | 10.5 |
| | 100.5 |

*A low density, hollow silica glass particle available from Patentech Corporation, Shepherd Grove, Illinois.

The above dry materials were mixed together by a simple tumbling operation until a uniform blend was obtained.

The dryblend mixture was deposited on a release-surfaced carrier to form a uniform layer of about 100 mils thick. Heat was then applied via infra-red irradiation of the top surface and electric heating of the lower platen for a period of about 2 minutes to bring the mixture to a temperature of about 375° F. to cause partial melting of surface portions of the dryblend granules and cause them to stick together at their points of contact. A sheet of non-woven glass scrim having a basis weight of about 35 g/m² and having linear dimensions similar to those of the dryblend layer was then placed thereon and slight consolidating pressure applied by passing the structure through a roll laminator.

Another layer of the same dryblend mixture similar in thickness to that of the first layer was deposited onto the glass scrim covering thereon and similiarly heated and slightly consolidated. After cooling, the composite sheet, which was approximately 100 mils thick, was cut into about 7 by 7 inch tile size portions which were low density, porous to air flow, reinforced and in a suitable condition for handling and further processing procedures.

A 3–4 mil poly(vinyl chloride) first coating film or layer was applied to a 1.42 (0.036 mm) thick polyester release carrier and heated to an interface temperature of about 290° F. (143° C.). The resulting film was then printed with vinyl inks in a decorative pattern. A second layer consisting of a 1-mil (0.025 mm) poly(vinyl chloride) coating, and in this case containing white pigment, is applied to the decorated surface of the poly(vinyl chloride) film and heated to an interface temperature of 270° F. (132° C.).

The decorated first layer and second layer were then cut into shapes and sizes corresponding to those of the base material without cutting the release carrier. The first and second films or layers were then applied to the top surface of the pieces of the base material which were pre-heated to only warm the top portions thereof, the second layer thus being positioned between the decorated upper film layer and the top surface of the base material. If an adhesive is used in the process, it is applied to the decorated surface of the first coating or film layer to assure good bonding of the first and second layers. The adhesive may be an acrylic type lacquer having the following composition:

| | Parts by Weight |
| --- | --- |
| *A21LV Resin | 13 |
| Ethyl Acetate | 43 |
| Methyl Ethyl Ketone | 13 |
| | 69 |

*A methyl methacrylate resin available from Rohm & Haas, Philadelphia, Pennsylvania.

Heat was applied from a silicone roller heated at about 400° F. to soften the adhesive on the decorated surface of the film, and light pressure was applied by a roll laminator to bond the second film layer to the base material. After cooling, the release carrier was removed. The top film layers were then perforated in registry through both layers using a pin roll to provide a plurality of 0.050 inch openings spaced about 5/16" apart.

The composite structures were then placed in a flat-bed press having water-cooled embossing and back-up plates. High frequency electrical energy was applied to fuse the resins in the structures which were then embossed by the downward pressure exerted by the embossing plate. As the pressure is applied, the entrapped air of the deep recesses of the embossing plate escapes through the in register holes in the top film layers into and through the porous base material. The heat then fuses the resins and allows the holes of the top layers to seal under continuing pressure resulting in an impermeable top film. The products were then allowed to cool under pressure, removed from the press, and die-cut in register to remove excess trim. A water-based acrylic type adhesive having the following formulation was then applied to the back of the finished pieces to facilitate their subsequent attachment to a surface such as a wall or floor:

| | Parts by Weight |
| --- | --- |
| *Polyacrylic Emulsion (UCAR174) | 98.62 |
| **Sodium Polyacrylic Solution (Alcogum 6940) | 1.31 |
| ***1,2-Benzisothiazolin-3-one (Proxel CRL) | 0.7 |

*available from Union Carbide, Danbury, Connecticut
**available from Alco Chemical Co., Philadelphia, Pennsylvania
***available from ICI America, Inc., Wilmington, Delaware A release-coated paper was then applied onto the adhesive. The paper is easily removable at the time of installation of the product on a substrate. The product is a stress-free, decorated, embossed surface covering having non-curling tendencies.

EXAMPLE II

A dimensionally stable, embossed, ornamented surface covering was formed by using the same base material dryblend-perlite mixture and procedures as in Example I. The decorated first and second film layers were also provided using the same materials and procedures as in Example I. In the formation of this surface covering, however, neither the first and second film layers nor the base material were cut prior to lamination of the films and base material. In this procedure, the decorated surface of the first film layer was interfaced with the top surface of the second film layer prior to application of the films to the base material, and heat and pressure was applied to activate the adhesive. After cooling, the release carrier was removed, the films perforated and the films and base material cut simultaneously in register with the design on the film.

The embossing of the structure, fusing of the resins, die-cutting to remove excess trim, and application of adhesive and release paper to the back of the product were done in the same manner and using the same materials as in Example I.

The surface covering formed is substantially dimensionally stable, stress free and has non-curling tendencies; is relatively easier and more economical to produce; and provides an improved, more aesthetically appealing product having improved surface maintenance properties.

It has been found that the perforations which aid in air release during embossing do not completely seal in some cases, for example, where the embossing plate is very deep and does not have enough raised areas to mechanically help seal the perforations, e.g., a deep, smooth, and recessed plate. Unsealed holes allow penetration of stains to the interior of the finished product in use, which is undesirable. By incorporating a second resinous thermoplastic layer beneath the decorated top layer or film, which second layer will soften in the embossing and fusion step prior to fusion of the top decorated film, the healing of the openings in the top film is assisted. This is because the greatest heat is generated within the structure of the base which is next to the more flowable second layer.

The second resinous thermoplastic layer may be a poly(vinyl chloride) layer, advantageously in the form of a plastisol or in the form of a sintered powder layer, such as that designated VYFS by Union Carbide. It could also be any of the other thermoplastic materials mentioned above for the base material, provided that it softens and starts to soften and flow prior to the softening and flowing of the first layer at a lower temperature than does the first, or top, perforated film or layer, thereby ensuring complete closure of the perforations in the final product.

In the preferred method of manufacture in which the base material is heated by radio frequency energy, and the embossing plate is cooled, e.g., to about 180° F. (82° C.), the second layer will soften and flow before the top layer because the second layer is closer to the high temperature material. The resulting flow in the second layer contributes to the sealing of the perforations.

What is claimed is:

1. A process for making a stress-free, dimensionally stable, embossed, ornamented surface covering comprising:
    (a) providing a low-density, air-containing, porous to allow passage of air therethrough, thermoplastic base layer comprising a preconsolidated resinous dryblend having preformed, hollow, non-thermoplastic particles homogeneously distributed therein;
    (b) providing a first resinous thermoplastic layer having a plurality of openings extending through the thickness thereof and adapted to allow passage of air therethrough during a subsequent embossing and fusion step;
    (c) applying the first resinous layer onto the base layer;
    (d) providing a second resinous thermoplastic layer between said first resinous layer and said base layer, said first and second resinous layers being capable of allowing passage of air through the thickness thereof during an embossing and fusion step, said second resinous layer further being adapted to soften and flow prior to the closing of the openings in the first resinous layer in the embossing and fusion step to assist in healing the openings of the first resinous layer, whereby complete closure of the openings in the first resinous layer is achieved and both first and second resinous layers are rendered substantially impermeable, and
    (e) embossing the composite structure in a flat bed press while applying heat and pressure thereto to fuse the resinous material and close at least the openings in the first resinous layer.

2. The process according to claim 1 wherein the first resinous thermoplastic layer is a film.

3. The process according to claim 2 wherein the film is a vinyl film.

4. The process according to claim 2, wherein the resinous thermoplastic film is selected from the group consisting of polyamides, polyacrylates, polyurethanes, polyesters, and polyethylenes.

5. The process according to claim 2 wherein the first resinous thermoplastic film layer is provided with ornamentation on one surface thereof.

6. The process according to claim 5, wherein the resinous thermplastic film is provided on a release carrier, the ornamentation on the film is on the surface thereof which faces away from the release carrier, and wherein the ornamentation-bearing film surface is interfaced with the top surface of the second resinous thermoplastic film layer and the release carrier is separated from the first resinous film layer prior to the embossing and fusion step.

7. The process according to claim 6, wherein shaped portions of the first resinous thermoplastic film layer are cut in register with the ornamented portions thereon while it is on the release carrier without cutting the carrier and prior to interfacing the ornament-bearing surface of the film with the top surface of the second resinous thermoplastic film layer, and wherein the second resinous thermoplastic film layer and the base material are provided in size and shapes corresponding to those of the cut portions of the first resinous film layer.

8. The process according to claim 6 including the step of cutting both the first and second resinous thermoplastic film layers and the base material in register with the ornamented portions on the first film layer after the design-bearing film surface has been interfaced with the top surface of the second resinous thermoplastic film and after the second resinous thermoplastic film has been applied to the base material and after separation of the release carrier from the first resinous thermoplastic film.

9. The process according to claim 2 wherein the second resinous thermoplastic layer is a film.

10. The process according to claim 1 wherein the second resinous thermoplastic layer is a liquid which is applied onto the base layer.

11. The process according to claim 1 wherein the second resinous thermoplastic layer is a powder applied onto the base layer.

12. The process according to claim 9 wherein the openings therethrough in the first resinous top film layer are formed by mechanical perforation thereof.

13. The process according to claim 12 wherein the second resinous thermoplastic layer is rendered capable of allowing passage of air through the thickness thereof by mechanical perforation thereof to form openings therethrough which openings of the first top film and second layer are in registry.

14. The process according to claim 13, wherein the flat bed press has an embossing plate with deep recesses and, during embossing, air entrapped in said recesses escapes through the in register holes of the first and second resinous layers into and through the porous base layer and, subsequently, the heat and pressure developed during embossing cause the holes of the first and second resinous layers to seal.

15. The process according to claim 1 wherein the base material is provided by:

(a) preparing a mixture comprising from about 98 to about 80 percent by weight of vinyl resin dryblend composition, and from about 2 to about 20 percent by weight of expanded perlite particles comprised essentially of particles having a diameter of from about 35-to 850 microns;

(b) forming a first layer of said mixture to a desired thickness on a release surface;

(c) heating said first layer of said mixture at a temperature sufficient to cause partial melting of the dryblend granules at their points of contact, thereby forming bonds which result in the formation of a cohesive porous layer;

(d) applying a reinforcing material onto the surface of the cohesive porous dryblend layer;

(e) applying slight consolidating pressure to the composite structure so formed;

(f) forming a second layer of the mixture prepared in step (a) to a desired thickness on the reinforcing material-dryblend structure formed by steps (d) and (e);

(g) heating said second layer of said mixture as in step (c) to obtain similar results; and (h) applying slight consolidating pressure to said second cohesive porous layer, thereby obtaining a low-density, porous to air flow, reinforced, thermoplastic resinous structure which is receptive to high frequency electrical energy and capable of being further consolidated by vertically applied pressure, with a minimum of lateral extrusion.

16. The process according to claim 1, wherein the heat and pressure applied to the first and second resinous thermoplastic layers and the base material to fuse and emboss the composite structure and render said first and second resinous layers impermeable is accomplished by placing the structure in a flatbed press having a cooled embossing plate and a cooled backing plate and applying high frequency electrical energy to the structure after the press is closed.

17. The process according to claim 1 wherein said first and second resinous layers are transparent after fusion, and wherein ornamentation is provided on the top surface of the base material prior to application of said first and second resinous layers thereto.

* * * * *